United States Patent
Yang et al.

(10) Patent No.: US 11,644,388 B2
(45) Date of Patent: May 9, 2023

(54) SYSTEM AND METHOD FOR INTEGRATEDLY TESTING DAMPING PERFORMANCE OF HYDRO-PNEUMATIC SUSPENSION VEHICLE

(71) Applicant: HUNAN UNIVERSITY OF SCIENCE AND TECHNOLOGY, Xiangtan (CN)

(72) Inventors: Shuyi Yang, Xiangtan (CN); Lili Liao, Xiangtan (CN); Lingyun Qin, Xiangtan (CN); Shixiong Tang, Xiangtan (CN); Dong Ao, Xiangtan (CN); Juchuan Dai, Xiangtan (CN); Qihui Ling, Xiangtan (CN); Yong Guo, Xiangtan (CN); Zhewu Chen, Xiangtan (CN); Hongzhou Li, Xiangtan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 0 days.

(21) Appl. No.: 17/677,017

(22) Filed: Feb. 22, 2022

(65) Prior Publication Data

US 2022/0178790 A1 Jun. 9, 2022

(30) Foreign Application Priority Data

Mar. 10, 2021 (CN) .......................... 202110260670.7

(51) Int. Cl.
*G01M 17/04* (2006.01)

(52) U.S. Cl.
CPC .................................. *G01M 17/04* (2013.01)

(58) Field of Classification Search
CPC .................................................... G01M 17/04
See application file for complete search history.

(56) References Cited

U.S. PATENT DOCUMENTS

| 2020/0378869 A1 | 12/2020 | Wang et al. | |
| 2022/0316991 A1* | 10/2022 | Alateng | G01M 17/045 |
| 2022/0316992 A1* | 10/2022 | Zhu | G01M 17/045 |
| 2022/0316993 A1* | 10/2022 | Xu | G01M 17/045 |

FOREIGN PATENT DOCUMENTS

| CN | 109489997 A | 3/2019 |
| CN | 110274577 A | 9/2019 |

* cited by examiner

*Primary Examiner* — Eric S. McCall

(57) ABSTRACT

A system for integratedly testing damping performance of a hydro-pneumatic suspension vehicle, including a testing platform and a testing device. The testing device includes a sensor module, a data acquiring and processing module and a testing software. A method for integratedly testing damping performance of a hydro-pneumatic suspension vehicle is also provided. A calculation is performed by a testing software to optimize a sensor configuration. A signal is acquired and transmitted by the sensor module. The signal is acquired and processed by a data acquiring and processing module, and displayed and analyzed by the testing software.

8 Claims, 3 Drawing Sheets

Pseudocode of an improved particle swarm algorithm

Procedure PSO
  for each particle i
    Initialize velocity Vi and position Xi for particle i
    Evaluate particle i and set Pi =Xi
  end for
  Pg=min{Pi}
  while not stop
   for i =1 to N
    Update the velocity and position of particle i
    Evaluate particle i
    if fit (Xi) <fit (Pi)
      Pi =Xi;
    if fit (Pi) < fit (Pg)
      Pg=Pi ;
   end for
  end while

SYSTEM AND METHOD FOR INTEGRATEDLY TESTING DAMPING PERFORMANCE OF HYDRO-PNEUMATIC SUSPENSION VEHICLE

CROSS-REFERENCE TO RELATED APPLICATIONS

This application claims the benefit of priority from Chinese Patent Application No. 202110260670.7, filed on Mar. 10, 2021. The content of the aforementioned application, including any intervening amendments thereto, is incorporated herein by reference in its entirety.

TECHNICAL FIELD

This application relates to vehicle vibration testing, and more specifically to a device and method for integratedly testing damping performance of a hydro-pneumatic suspension vehicle.

BACKGROUND

In recent years, vehicles have been largely popularized and frequently used. The vibration isolation characteristic is a key indicator for evaluating the handling stability, ride comfort and trafficability of a vehicle. The suspension system, as a main device for the vibration isolation, can significantly alleviate an impact generated during the running of the vehicle, weaken the vibration of the load-bearing system and play a guiding role. The test and analysis of vibration characteristics can help identify the parameters of the suspension system such as natural frequency, vibration mode, stiffness and damping ratio, so as to obtain a frequency-response characteristic of a key component and optimize a structure of the key component to improve the damping performance of the vehicle. Different from other suspension systems, the stiffness of the hydro-pneumatic suspension system is affected by an oil pressure of individual oil cylinders. Therefore, a pressure transmitter is additionally required to test the oil pressure of each oil cylinder to identify the stiffness of the hydro-pneumatic suspension system.

For the test of the damping performance of vehicles, it is generally necessary to optimize the arrangement of sensors to obtain more accurate vibration characteristics with fewer sensors, so as to improve the test accuracy and reduce cost. However, most vibration testing systems and vibration monitoring and analysis systems of vehicles are lack of the function for optimizing the sensor configuration, and thus the optimization of the sensor configuration and the vibration testing need to be operated on different software. At present, the testing system for the hydro-pneumatic suspension vehicles has not been fully developed, and the existing testing systems require high development cost and long development cycles, and have poor portability.

Therefore, a system and method for integratedly testing damping performance of a hydro-pneumatic suspension vehicle are provided herein, which are of great significance for the improvement of the vehicle vibration testing technology.

SUMMARY

In order to solve the technical problems mentioned above, the present disclosure introduce the function of optimizing the sensor configuration, and provides a system and method for integratedly testing damping performance of a hydro-pneumatic suspension vehicle with high test accuracy, convenient operations and low cost.

The technical solutions of the present disclosure are described as follows.

In a first aspect, this application provides a system for integratedly testing damping performance of a hydro-pneumatic suspension vehicle, comprising:

a testing platform; and a testing device;

wherein the testing platform is configured for placement of a hydro-pneumatic suspension vehicle to be tested, and simulate a road excitation to allow the hydro-pneumatic suspension vehicle to be tested to generate a vibration response; and the testing device comprises a sensor module, a data acquiring and processing module and a testing software;

the sensor module comprises a pressure transmitter, a speed sensor, an acceleration sensor, a displacement sensor and a dual-axis tilt sensor; the pressure transmitter is configured to detect a change of an oil pressure of each oil cylinder of a hydro-pneumatic suspension system of the hydro-pneumatic suspension vehicle to be tested; the speed sensor, the acceleration sensor and the displacement sensor are respectively configured to measure a vertical velocity, a vertical acceleration and a vertical displacement of the testing platform when the testing platform generates the road excitation, and measure a vertical velocity, a vertical acceleration and a vertical displacement of the hydro-pneumatic suspension vehicle to be tested when the hydro-pneumatic suspension vehicle to be tested is subjected to the road excitation; the dual-axis tilt sensor is configured to detect a vertical tilt and a lateral tilt of a main body of the hydro-pneumatic suspension vehicle to be tested; the data acquiring and processing module is embedded with a signal conditioning unit, and is configured to, after receiving a detection signal transmitted by the sensor module, be connected to an upper computer through a universal serial bus (USB) interface, and transmit a processed signal to the upper computer; and the testing software is developed under a Labview program development environment, and integrates functions of sensor configuration optimization, data acquisition and display and data process and analysis.

In an embodiment, the testing platform is composed of twelve electro-hydraulic servo vibration exciters.

In an embodiment, the road excitation is generated through fitting an elevation data of an actual road.

In an embodiment, the signal conditioning unit comprises a variable gain amplifier circuit; and the testing software is configured to adjust a gain of the signal conditioning unit.

In an embodiment, the function of the sensor configuration optimization is configured to optimize an arrangement position and the number of sensors.

In an embodiment, the function of the data process and analysis is configured to process and analyze acquired signal data including pressure, speed, acceleration, displacement and tilt of the main body of the hydro-pneumatic suspension vehicle to be tested in real time.

In a second aspect, this application also provides a method for integratedly testing damping performance of a hydro-pneumatic suspension vehicle, comprising:

(S1) determining the number and an arrangement position of individual sensors using a mixed programming of LabVIEW and Matlab to optimize a configuration of the sensor module; and calling, by the testing software, a Matlab script node to carry out a calculation to optimize configuration of the pressure transmitter, the speed sensor, the acceleration sensor, the displacement sensor and the dual-axis tilt sensor;

(S2) acquiring, by the pressure transmitter, an oil pressure signal of an oil cylinder; acquiring, by the dual-axis tilt sensor, a tilt signal of a hydro-pneumatic suspension vehicle to be tested; acquiring, by the speed sensor, a speed signal of the hydro-pneumatic suspension vehicle to be tested and a speed signal of the testing platform; acquiring, by the acceleration sensor, an acceleration signal of the hydro-pneumatic suspension vehicle to be tested and an acceleration signal of the testing platform; acquiring, by the displacement sensor, a displacement signal of the hydro-pneumatic suspension vehicle to be tested and an acceleration signal of the testing platform; and transmitting, by the sensor module, an analog signal consisting of the oil pressure signal of the oil cylinder, the tilt signal of the hydro-pneumatic suspension vehicle to be tested, the speed signal of the hydro-pneumatic suspension vehicle to be tested, the speed signal of the testing platform, the acceleration signal of the hydro-pneumatic suspension vehicle to be tested, the acceleration signal of the testing platform, the displacement signal of the hydro-pneumatic suspension vehicle to be tested and the acceleration signal of the testing platform to the data acquiring and processing module;

(S3) acquiring, by the data acquiring and processing module, the analog signal transmitted by the sensor module;

converting, by the data acquiring and processing module, the analog signal into a digital signal; and subjecting the digital signal to amplification and anti-aliasing filtering according to signal conditioning parameters set by the testing software; and (S4) transmitting, by the testing software and the data acquiring and processing module, the digital signal to the upper computer to obtain a measurement value of a vibration characteristic parameter; and processing and analyzing, by the upper computer, the measurement value in real time to extract characteristic information related to an operating state of the hydro-pneumatic suspension vehicle to be tested from a vibration signal.

In an embodiment, the configuration of the sensor module is optimized through the following steps:

a) selecting a modal assurance criterion (MAC) as a criterion for optimizing sensor configuration;

wherein an element of a MAC matrix is calculated according to a formula shown as follows:

$$MAC_{ij} = \frac{(\Phi_i^T \cdot \Phi_j)^2}{(\Phi_i^T \cdot \Phi_i)(\Phi_j^T \cdot \Phi_j)};$$

wherein $\Phi_i$ is a i-th modal vector and $\Phi_j$ is a j-th modal vector;

b) selecting an improved particle swarm optimization algorithm as a calculation method for optimizing the sensor configuration;

wherein suppose that a particle swarm N composed of all particles is searched in a D-dimensional space; a position of particle i is $x_i=(x_{i1}, x_{i2}, \ldots, x_{id})^T$; a flight speed of the particle i is $v_i=(v_{i1}, v_{i2}, \ldots, v_{id})^T$; an optimal position experienced by the particle i is $p_i=(p_{i1}, p_{i2}, \ldots, p_{id})^T$; and an optimal position experienced by the particle swarm N is $p_g=(x_{g1}, x_{g2}, \ldots, x_{gd})^T$, an improved formula for updating a speed and a position of the particle swarm N is expressed as follows:

$$v_{id}^{k+1} = w \cdot v_{id}^k + c_1 \cdot r_1 \cdot (p_{id}^k - x_{id}^k) + c_2 \cdot r_2 \cdot (p_{gd}^k - x_{id}^k);$$

$$x_{id}^{k+1} = x_{id}^k + v_{id}^{k+1};$$

wherein i=1, 2, . . . , N; d=1, 2, . . . , D; k is the number of iterations at the moment; and an inertia factor w and collaborative learning factors $c_1$ and $c_2$ are calculated using a linear decreasing weight strategy, shown as follows:

$$w_k = w_{end} + (w_{start} - w_{end})\left(1 - \frac{k}{M}\right); \text{ and}$$

$$c_1 = c_2 = c_{max} - (c_{max} - c_{min})\frac{k}{M};$$

wherein M is a maximum number of iterations; $w_{start}$ is 0.9; $w_{end}$ is 0.4; $c_{min}$ is 0.8; and $c_{max}$ is 2.1; and c) optimizing the sensor configuration as follows:

(1) selecting a primary measurement point according to a modal analysis of the hydro-pneumatic suspension vehicle to be tested; and importing a mode shape of the primary measurement point at different orders into the testing software;

(2) calling the Matlab script node in a background of the testing software; and performing programming of the improved particle swarm optimization algorithm;

(3) increasing the number of sensors sequentially, and setting a corresponding parameter; and performing, by the testing software, calculation to obtain an optimization result of the sensor configuration; and (4) selecting an optimal configuration quantity and an optimal configuration position of the sensor module according to the criterion for optimizing the sensor configuration.

Compared to the prior art, the present disclosure has the following beneficial effects.

The present disclosure introduces the function of optimizing a sensor configuration, and provides a system and method for integratedly testing damping performance of a hydro-pneumatic suspension vehicle with high test accuracy, convenient operations and low cost.

DETAILED DESCRIPTION OF EMBODIMENTS

The present disclosure will be further described below with reference to the accompanying drawings.

Figure 1:
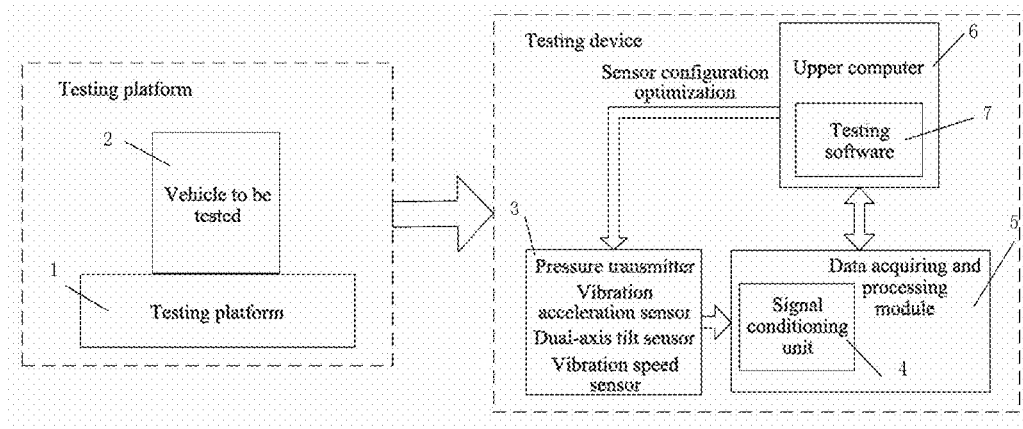
FIG. 1 schematically depicts a structure of a system for integratedly testing damping performance of a hydro-pneumatic suspension vehicle according to an embodiment of the present disclosure.

FIG. 1 schematically depicts a structure of a system for integratedly testing damping performance of a hydro-pneumatic suspension vehicle, which includes a testing platform 1, a sensor module 3, a data acquiring and processing module 5 and an upper computer 6.

The testing platform 1 is composed of twelve electro-hydraulic servo hydraulic vibration exciters, and is configured for the placement of a hydro-pneumatic suspension vehicle to be tested 2 and allow the hydro-pneumatic suspension vehicle to be tested to generate a vibration response. The sensor module 3 includes a pressure transmitter, a speed sensor, an acceleration sensor, a displacement sensor and a dual-axis tilt sensor. The pressure transmitter is configured to detect a change of an oil pressure of each oil cylinder of a hydro-pneumatic suspension system of the hydro-pneumatic suspension vehicle to be tested. The speed sensor, the acceleration sensor and the displacement sensor are respectively configured to measure a vertical velocity, a vertical acceleration and a vertical displacement of the testing platform when the testing platform generates a road excitation, and measure a vertical velocity, a vertical acceleration and a vertical displacement of the hydro-pneumatic suspension vehicle to be tested when the hydro-pneumatic suspension vehicle to be tested is subjected to the road excitation. The dual-axis tilt sensor is configured to detect a vertical tilt and a lateral tilt of a main body of the hydro-pneumatic suspension vehicle to be tested. The data acquiring and processing module 5 is embedded with a signal conditioning unit 4 for conditioning a signal received by the sensor module into a signal that is easily received by a data acquisition device, and is connected to the upper computer 6 through a universal serial bus (USB) interface and transmit a processed signal to the upper computer 6. The upper computer 6 is provided with a testing software 7 that matches a hardware of the system. The testing software 7 is developed under a Labview program development environment, and integrates functions of sensor configuration optimization, data acquisition and display and data process and analysis.

Figure 2:
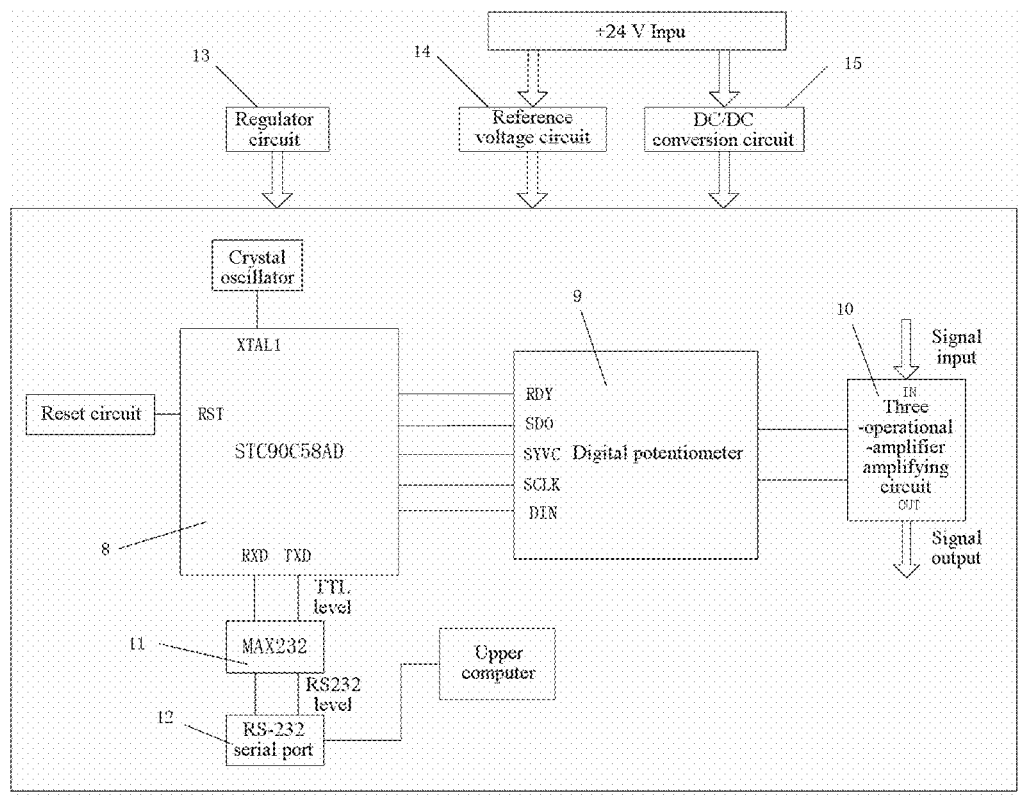
FIG. 2 schematically depicts a structure of a variable gain amplifier circuit according to an embodiment of the present disclosure.

FIG. 2 schematically depicts a structure of a variable gain amplifier circuit. A variable gain amplifier circuit module includes an STC90C58AD control chip 8, a digital adjustable resistance circuit 9, a three-operational-amplifier amplifying circuit 10, a serial communication circuit formed with a MAX232 chip 11 and an RS-232 interface 12, a voltage regulator circuit 13, a reference voltage circuit 14 and a direct current/direct current (DC/DC) conversion circuit 15. During setting an amplification gain, the upper computer sends an instruction to the STC90C58AD control chip 8 through the testing software, so as to control a digital potentiometer to change a gain of the three-operational-amplifier amplifying circuit 10; a MAX232 level switch conversion chip 11 converses a transistor-transistor logic (TTL) level output by the STC90C58AD control chip 8 to an RS-232 level, and communicates with the upper computer through the RS-232 interface 12; the voltage regulator circuit 13 selects LM2576T-5V to stable at a voltage of 5V; and the reference voltage circuit 14 adjusts an input voltage of +24 V to a desired voltage reference.

Figure 3:
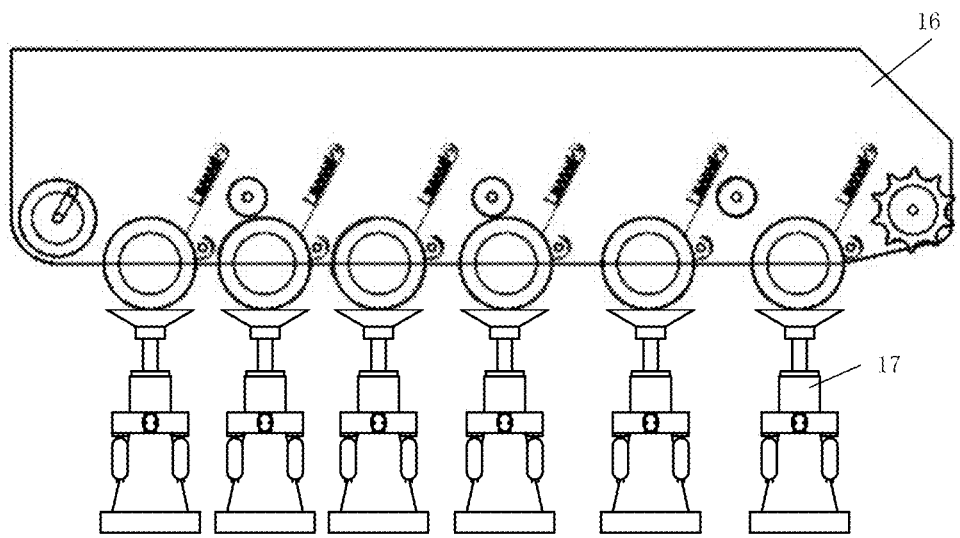
FIG. 3 is a left side view of a testing platform according to an embodiment of the present disclosure.

FIG. 3 is a left side view of the testing platform. A vehicle to be tested 16 is a hydro-pneumatic suspension vehicle. In an electro-hydraulic servo vibration exciter 17, a controller is configured to generate a road excitation obtained through fitting an elevation data of an actual road. After being amplified by a servo amplifier, the amplified signal is added to an electro-hydraulic servo valve. The electro-hydraulic servo valve is connected with an oil cylinder. A servo valve nozzle baffle is configured to move according to a signal and a frequency to drive a four-way slide valve to move, so as to allow a high-pressure oil to flow into the oil cylinder through a window of the four-way slide valve. A piston rod in the oil cylinder is connected to a working table, and is configured to drive a load to vibrate vertically.

Figure 4:
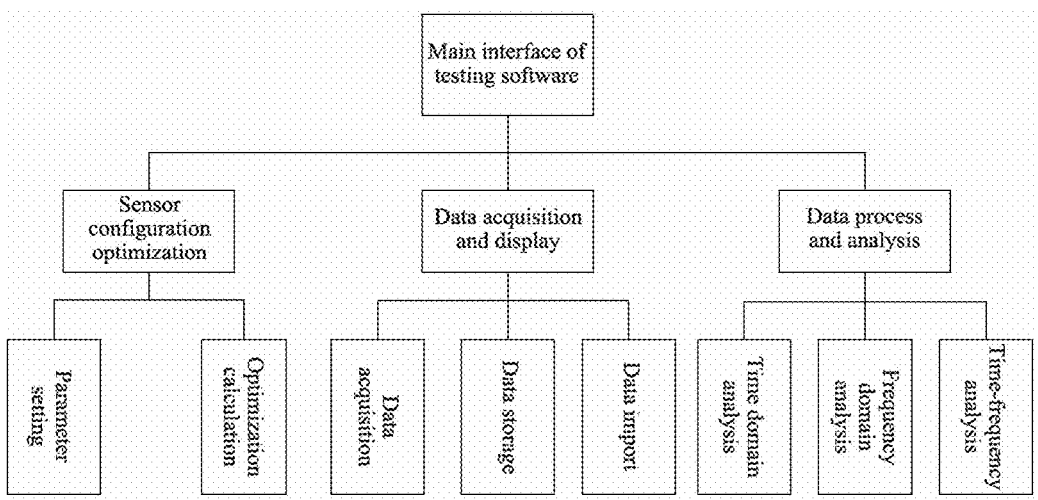
FIG. 4 is a structural block diagram of a testing software according to an embodiment of the present disclosure.

FIG. 4 is a block diagram of a structure of the testing software according to an embodiment of the present disclosure. The testing software mainly includes functions of sensor configuration optimization, data acquisition and display and data process and analysis.

A method for integratedly testing damping performance of a hydro-pneumatic suspension vehicle is further provided, which is performed through the following steps.

(S1) Mode shape data of the hydro-pneumatic suspension vehicle shown in Table 1 is imported into the testing software, and an optimization parameter is set. A Matlab script node is called by the testing software to calculate an improved particle swarm optimization algorithm and carry out a calculation to optimize configuration of the pressure transmitter, the speed sensor, the acceleration sensor, the displacement sensor and the dual-axis tilt sensor.

TABLE 1

Mode shape data of the hydro-pneumatic suspension vehicle

| Measuring point | Total displacement mode | Displacement mode in x direction | Displacement mode in y direction | Displacement mode in z direction |
| --- | --- | --- | --- | --- |
| 1 | 1.65E−01 | 1.03E−01 | 1.58E−01 | 4.67E−01 |
| 2 | 1.57E−01 | 3.65E−02 | 1.50E−01 | −2.01E−01 |
| 3 | 1.59E−01 | −5.12E−03 | 1.51E−01 | 5.09E−01 |
| 4 | 1.59E−01 | 1.29E−02 | 1.51E−01 | −5.14E−01 |
| 5 | 1.57E−01 | −2.91E−02 | 1.50E−01 | −4.61E−01 |
| 6 | 1.65E−01 | −9.47E−02 | 1.58E−01 | −4.64E−01 |

Specifically, the configuration of the sensor module is optimized through the following steps.

a) A modal assurance criterion (MAC) is selected as a criterion for optimizing a sensor configuration.

An element of a MAC matrix is calculated according to a formula shown as follows:

$$MAC_{ij} = \frac{(\Phi_i^T \cdot \Phi_j)^2}{(\Phi_i^T \cdot \Phi_i)(\Phi_j^T \cdot \Phi_j)};$$

where $\Phi_i$ is a i-th modal vector and $\Phi_j$ is a j-th modal vector.

b) An improved particle swarm optimization algorithm is selected as a calculation method for optimizing the sensor configuration.

Suppose that a particle swarm N composed of all particles is searched in D-dimensional space; a position of particle i is $x_i=(x_{i1}, x_{i2}, \ldots, x_{id})^T$; a flight speed of the particle is $v_i=(v_{i1}, v_{i2}, \ldots, v_{id})^T$; an optimal position experienced by the particle i is $p_i=(p_{i1}, p_{i2}, \ldots, p_{id})^T$, and an optimal position experienced by the particle swarm N is $p_g=(x_{g1}, x_{g2}, \ldots, x_{gd})^T$; an improved formula for updating a speed and a position of the particle swarm N is expressed as follows:

$$v_{id}^{k+1} = w \cdot v_{id}^k + c_1 \cdot r_1 \cdot (p_{id}^k - x_{id}^k) + c_2 \cdot r_2 \cdot (p_{gd}^k - x_{id}^k);$$

$$x_{id}^{k+1} = x_{id}^k + v_{id}^{k+1};$$

wherein i=1, 2, . . . , N; d=1, 2, . . . , D; k is the number of iterations at the moment.

An inertia factor w and collaborative learning factors $c_1$ and $c_2$ are calculated using a linear decreasing weight strategy, shown as follows:

$$w_k = w_{end} + (w_{start} - w_{end})\left(1 - \frac{k}{M}\right); \text{ and}$$

$$c_1 = c_2 = c_{max} - (c_{max} - c_{min})\frac{k}{M};$$

where M is a maximum number of iterations; $w_{start}$ is 0.9; $w_{end}$ is 0.4; $c_{min}$ is 0.8; and $c_{max}$ is 2.1.

Figures 5, 6:
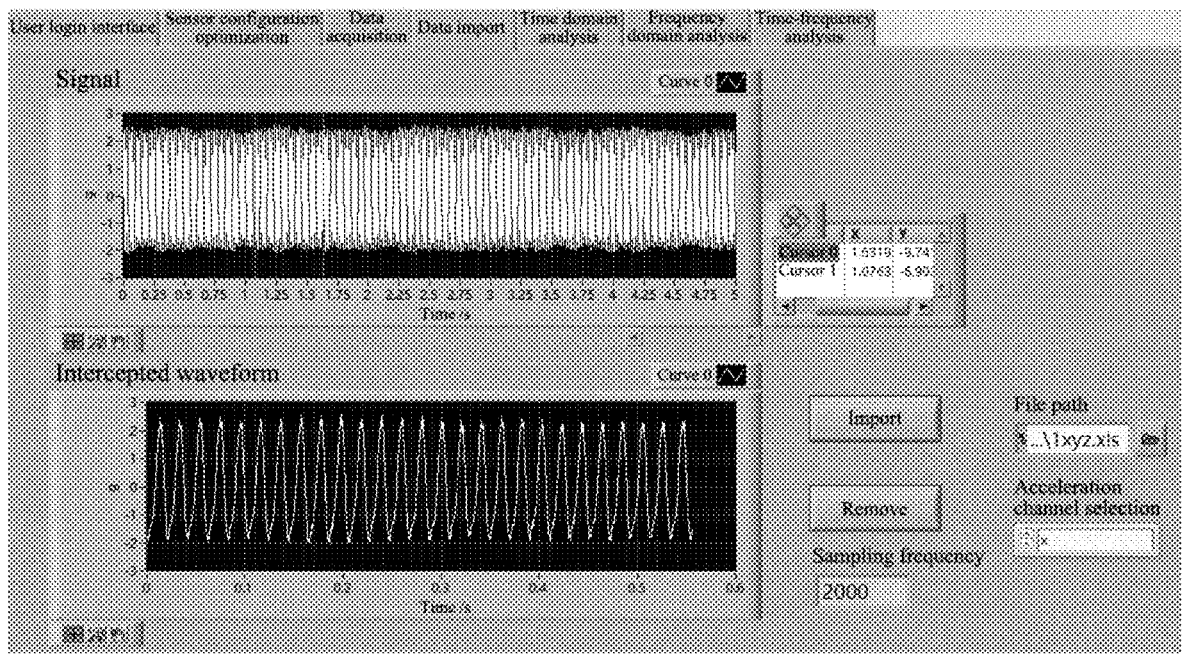
FIG. 5 shows a pseudocode of an improved particle swarm optimization algorithm according to an embodiment of the present disclosure.
FIG. 6 is a front panel of the system according to an embodiment of the present disclosure.

FIG. 5 is a pseudocode of the improved particle swarm algorithm, in which $$\text{fit} = \max |(MAC_{ij})|, (i \neq j).$$

(S2) An oil pressure signal of the oil cylinder is acquired by the pressure transmitter; a tilt signal of a hydro-pneumatic suspension vehicle to be tested is acquired by the dual-axis tilt sensor; a speed signal of the hydro-pneumatic suspension vehicle to be tested and a speed signal of the testing platform are acquired by the speed sensor; an acceleration signal of the hydro-pneumatic suspension vehicle to be tested and an acceleration signal of the testing platform are acquired by the acceleration sensor; a displacement signal of the hydro-pneumatic suspension vehicle to be tested and an acceleration signal of the testing platform are acquired by the displacement sensor. An analog signal consisting of the oil pressure signal of the oil cylinder, the tilt signal of the hydro-pneumatic suspension vehicle to be tested, the speed signal of the hydro-pneumatic suspension vehicle to be tested, the speed signal of the testing platform, the acceleration signal of the hydro-pneumatic suspension vehicle to be tested, the acceleration signal of the testing platform, the displacement signal of the hydro-pneumatic suspension vehicle to be tested and the acceleration signal of the testing platform are transmitted to the data acquiring and processing module.

(S3) The analog signal transmitted by the sensor module is acquired by the data acquiring and processing module, and the analog signal is converted into a digital signal. The digital signal is amplified and anti-alias filtered according to the signal conditioning parameters set by the testing software 7.

(S4) As shown in FIG. 6, the digital signal is transmitted to the upper computer by the testing software 7 and the data acquiring and processing module 5 to obtain a measurement value of a vibration characteristic parameter. The measurement value is processed and analyzed by the upper computer in real time to extract characteristic information related to an operating state of the hydro-pneumatic suspension vehicle to be tested from a vibration signal.

The technical solutions that are not specifically described herein are the prior art.

The embodiments mentioned above are merely illustrative of the present disclosure, and not intended to limit the present disclosure. It should be understood that any modifications, replacements and improvements made by those skilled in the art without departing from the spirit of the present disclosure should fall within the scope of the present disclosure defined by the appended claims.

What is claimed is:

1. A system for integratedly testing damping performance of a hydro-pneumatic suspension vehicle, comprising:
a testing platform; and
a testing device;
wherein the testing platform is configured for placement of a hydro-pneumatic suspension vehicle to be tested, and simulate a road excitation to allow the hydro-pneumatic suspension vehicle to be tested to generate a vibration response; and the testing device comprises a sensor module, a data acquiring and processing module and a testing software;
the sensor module comprises a pressure transmitter, a speed sensor, an acceleration sensor, a displacement sensor and a dual-axis tilt sensor; the pressure transmitter is configured to detect a change of an oil pressure of each oil cylinder of a hydro-pneumatic suspension system of the hydro-pneumatic suspension vehicle to be tested; the speed sensor, the acceleration sensor and the displacement sensor are respectively configured to measure a vertical velocity, a vertical acceleration and a vertical displacement of the testing platform when the testing platform generates the road excitation, and measure a vertical velocity, a vertical acceleration and a vertical displacement of the hydro-pneumatic suspension vehicle to be tested when the hydro-pneumatic suspension vehicle to be tested is subjected to the road excitation; the dual-axis tilt sensor is configured to detect a vertical tilt and a lateral tilt of a main body of the hydro-pneumatic suspension vehicle to be tested; the data acquiring and processing module is embedded with a signal conditioning unit, and is configured to, after receiving a detection signal transmitted by the sensor module, be connected to an upper computer through a universal serial bus (USB) interface and transmit a processed signal to the upper computer; and the testing software is developed under a Labview program development environment, and integrates a function of sensor configuration optimization, a function of data acquisition and display and a function of data process and analysis.

2. The system of claim 1, wherein the testing platform is composed of twelve electro-hydraulic servo vibration exciters.

3. The system of claim 1, wherein the road excitation is generated through fitting an elevation data of an actual road.

4. The system of claim 1, wherein the signal conditioning unit comprises a variable gain amplifier circuit; and the testing software is configured to adjust a gain of the signal conditioning unit.

5. The system of claim 1, wherein the function of sensor configuration optimization is configured to optimize an arrangement position and the number of sensors.

6. The system of claim 1, wherein the function of the data process and analysis is configured to process and analyze acquired signal data including pressure, speed, acceleration, displacement and tilt of the main body of the hydro-pneumatic suspension vehicle to be tested in real time.

7. A method for integratedly testing damping performance of a hydro-pneumatic suspension vehicle using the system of claim 1, comprising:
(S1) determining the number and an arrangement position of individual sensors using a mixed programming of LabVIEW and Matlab to optimize a configuration of the sensor module; and calling, by the testing software, a Matlab script node to carry out a calculation to optimize configuration of the pressure transmitter, the speed sensor, the acceleration sensor, the displacement sensor and the dual-axis tilt sensor;
(S2) acquiring, by the pressure transmitter, an oil pressure signal of an oil cylinder; acquiring, by the dual-axis tilt sensor, a tilt signal of a hydro-pneumatic suspension vehicle to be tested; acquiring, by the speed sensor, a speed signal of the hydro-pneumatic suspension vehicle to be tested and a speed signal of the testing platform; acquiring, by the acceleration sensor, an acceleration signal of the hydro-pneumatic suspension vehicle to be tested and an acceleration signal of the testing platform; acquiring, by the displacement sensor, a displacement signal of the hydro-pneumatic suspension vehicle to be tested and an acceleration signal of the testing platform; and transmitting, by the sensor module, an analog signal consisting of the oil pressure signal of the oil cylinder, the tilt signal of the hydro-pneumatic suspension vehicle to be tested, the speed signal of the hydro-pneumatic suspension vehicle to be tested, the speed signal of the testing platform, the acceleration signal of the hydro-pneumatic suspension vehicle to be tested, the acceleration signal of the testing platform, the displacement signal of the hydro-pneumatic suspension vehicle to be tested and the acceleration signal of the testing platform to the data acquiring and processing module;

(S3) acquiring, by the data acquiring and processing module, the analog signal transmitted by the sensor module;

converting, by the data acquiring and processing module, the analog signal into a digital signal; and subjecting the digital signal to amplification and anti-aliasing filtering according to signal conditioning parameters set by the testing software; and (S4) transmitting, by the testing software and the data acquiring and processing module, the digital signal to the upper computer to obtain a measurement value of a vibration characteristic parameter; and processing and analyzing, by the upper computer, the measurement value in real time to extract characteristic information related to an operating state of the hydro-pneumatic suspension vehicle to be tested from a vibration signal.

8. The method of claim 7, wherein the configuration of the sensor module is optimized through the following steps:

a) selecting a modal assurance criterion (MAC) as a criterion for optimizing a sensor configuration;

wherein an element of a MAC matrix is calculated according to a formula shown as follows:

$$MAC_{ij} = \frac{(\Phi_i^T \cdot \Phi_j)^2}{(\Phi_i^T \cdot \Phi_i)(\Phi_j^T \cdot \Phi_j)};$$

wherein $\Phi_i$ is a i-th modal vector and $\Phi_j$ is a j-th modal vector;

b) selecting an improved particle swarm optimization algorithm as a calculation method for optimizing the sensor configuration;

wherein suppose that a particle swarm N composed of all particles is searched in a D-dimensional space; a position of particle i is $x_i=(x_{i1}, x_{i2}, \ldots, x_{id})^T$; a flight speed of the particle i is $v_i=(v_{i1}, v_{i2}, \ldots, v_{id})^T$; an optimal position experienced by the particle i is $p_i=(p_{i1}, p_{i2}, \ldots, p_{id})^T$; and an optimal position experienced by the particle swarm N is $p_g=(x_{g1}, x_{g2}, \ldots, x_{gd})^T$; an improved formula for updating a speed and a position of the particle swarm N is expressed as follows:

$$v_{id}^{k+1}=w \cdot v_{id}^k+c_1 \cdot r_1 \cdot (p_{id}^k-x_{id}^k)+c_2 \cdot r_2 \cdot (p_{gd}^k-x_{id}^k);$$

$$x_{id}^{k+1}=x_{id}^k+v_{id}^{k+1};$$

wherein i=1, 2, ..., N; d=1, 2, ..., D; k is the number of iterations at the moment; and an inertia factor w and collaborative learning factors $c_1$ and $c_2$ are calculated using a linear decreasing weight strategy, shown as follows:

$$w_k = w_{end} + (w_{start} - w_{end})\left(1 - \frac{k}{M}\right); \text{ and}$$

$$c_1 = c_2 = c_{max} - (c_{max} - c_{min})\frac{k}{M};$$

wherein M is a maximum number of iterations; $w_{start}$ is 0.9; $w_{end}$ is 0.4; $c_{min}$ is 0.8; and $c_{max}$ is 2.1; and c) optimizing the sensor configuration as follows:

(1) selecting a primary measurement point according to a modal analysis of the hydro-pneumatic suspension vehicle to be tested; and importing a mode shape of the primary mesurement point at different orders into the testing software;

(2) calling the Matlab script node in a background of the testing software; and performing programming of the improved particle swarm optimization algorithm;

(3) increasing the number of sensors sequentially and setting a corresponding parameter; and performing, by the testing software, calculation to obtain an optimization result of the sensor configuration; and (4) selecting an optimal configuration quantity and an optimal configuration position of the sensor module according to the criterion for optimizing the sensor configuration.

* * * * *